Patented Nov. 20, 1934

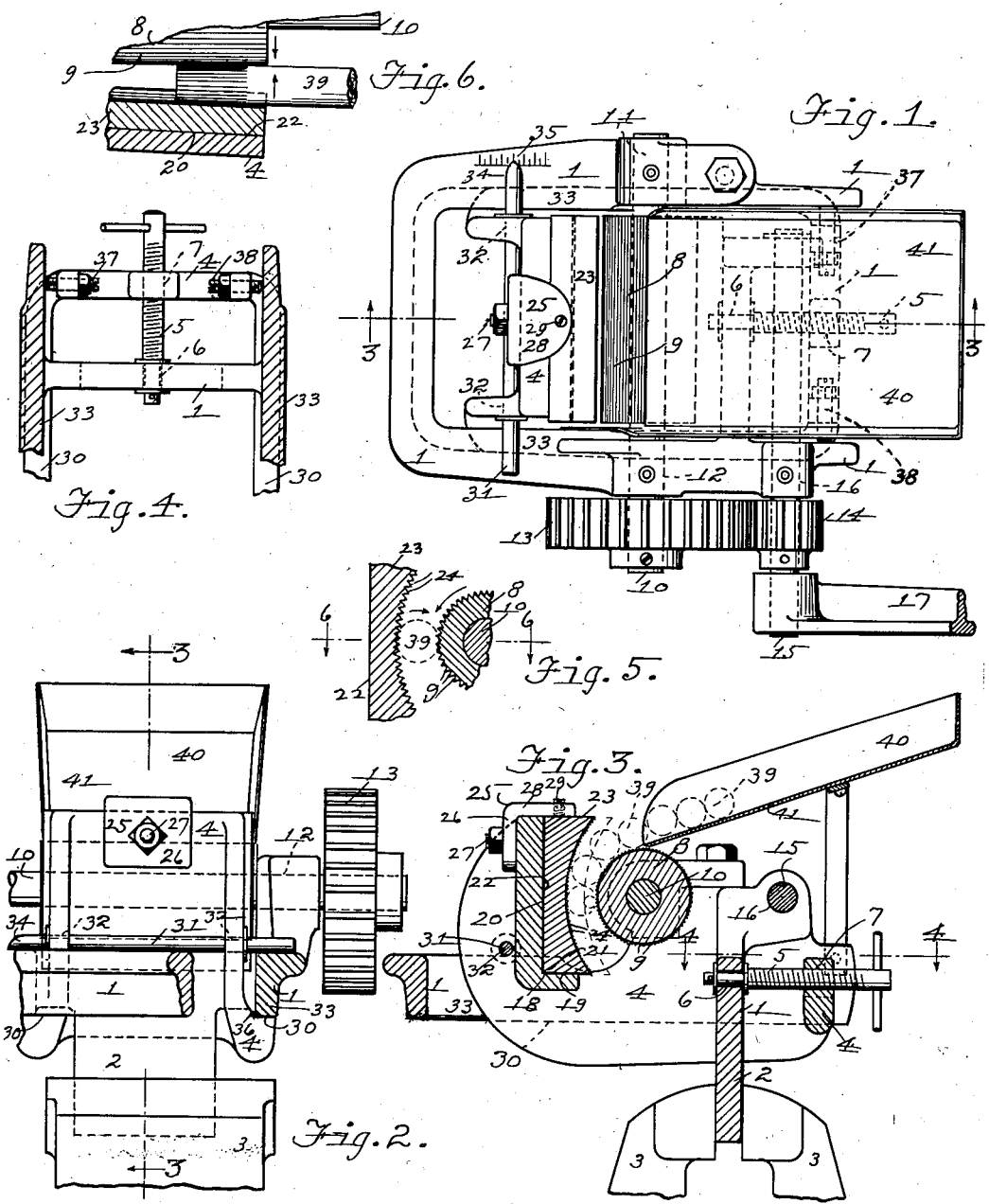

1,981,183

UNITED STATES PATENT OFFICE 1,981,183

DOWEL-MAKING MACHINE

Anthony Margelis, Grand Rapids, Mich.

Application April 14, 1932, Serial No. 605,281

3 Claims. (Cl. 144—30)

The present invention relates to dowel-making machines; and its object is to provide an improved machine whereby dowel pins may be reduced to a desired diameter, may be longitudinally scored, and may be tapered to a desired degree.

This and any other and more specific objects hereinafter appearing are attained by, and the invention finds preferable embodiment in, the illustrative machine particularly described in the body of this specification and illustrated by the accompanying drawing, in which:—

Figure 1 is a top plan view of a dowel making machine;

Figure 2 is an elevational front view thereof;

Figure 3 is a vertical sectional view of the same taken on line 3—3 of Figures 1 and 2;

Figure 4 is a horizontal sectional view of parts thereof taken on line 4—4 of Figure 3;

Figure 5 is a vertical sectional view (enlarged) of parts of the machine taken on line 3—3 of Figures 1 and 2; and Figure 6 is a horizontal sectional view of said parts taken on line 6—6 of Figure 5.

In the drawing is illustrated a machine for making dowel pins, i. e., for diminishing the diameter thereof, for longitudinally scoring them, and for tapering the same. This machine comprises a base member 1 which is fixedly mounted as by its downwardly extending part 2 which may be clamped between the jaws 3 of a vise. The machine comprises also a member 4 slidable to adjusted positions on the base member, being thus slid, and held in the adjusted position, by the manually operated screw 5 journalled at 6 in the base member and threaded at 7 in the slidable member.

One of the work-engaging elements, a roll 8 having longitudinally extending teeth 9, is carried by the shaft 10 journalled at 11, 12 on base member 1 and rotatable in successive complete revolutions by suitable means as its gear 13 meshing with a driving gear 14 on shaft 15 journalled at 16 on the base member and provided with a crank 17.

The slidable member 4 has a socket or recess 18 L-shaped in vertical cross section on whose horizontal part 19 and against whose vertical part 20 are adapted to rest the bottom edge 21 and the rear side 22 respectively of the other work-engaging element, the block 23, whose front side is concave in vertical cross section and provided with horizontally extending teeth 24 parallel with the teeth of the roll, the front side of this block being thus concave in a curve whose radius is greater than that of the roll. This block 23 is detachably held in said recess by an angular member 25 one of whose arms 26 is secured as by a screw bolt 27 to the slidable member 4, its other arm 28 being secured as by a screw 29 to this block.

Parallel ways at the opposite sides of the machine are provided for the sliding movement of member 4 on base member 1. For this purpose the member 4 is provided with the horizontal bearings 30 and the pin 31 thrust through openings 32 in said member, the parallel horizontal extensions 33 of base member 1 slidably bearing between bearings 30 and said pin. The end of this pin forms a pointer 34 indicating on the scale 35 of the base member the degree of separation of the roll 8 and block 23 which determines the diameter to which the dowel pins are to be reduced.

In order that the dowel pins may be tapered to a desired degree, the bearings on which member 4 may be slid are sufficiently wide laterally (as indicated at 36 in Figure 2) so that this member may be slidingly moved to an adjusted position in which the block 23 and the roll 8 are inclined to one another at an angle corresponding to the desired taper, whereupon said member 4 is held in such adjusted position by screw 5 and by turning down the set screws 37, 38 threaded in one of said members 4 or 1 into engagement with the other one of said members.

This sliding movement of member 4 to adjustably held position may be permitted in various ways, as by journalling the screw 5 loosely at 6 as indicated in Figures 3 and 4.

The dowel pins 39 may be introduced into the machine by thrusting them endwise between the roll 8 and the block 23, or preferably by depositing a number of them in the hopper or tray 40 mounted on base member 1 and having its bottom 41 inclined downwardly toward the roll. These dowel pins roll successively into the wide upper space between the roll 8 and the block 23 whereupon the roll being rotated in the direction which carries them downwardly into the increasingly narrower space between roll and block, these pins are successively, and each is progressively, reduced in diameter and longitudinally scored by the teeth 9 and 24, and then discharged at the lower end of said space. The screw 5 is turned to provide the desired degree to which the dowel pins are to be reduced in diameter; and, if the same are to be tapered, the desired degree of such tapering is determined by turning the screws 37, 38. A pin or rod may be thus tapered adjacent its end as indicated in Figure 6.

The work-engaging elements—the roll 8 and block 23—may exert a merely compressing action on the dowel pins to reduce their diameter.

It is evident that the work-engaging elements 8 and 23 may both be rolls compressing the dowel pins between them.

The invention being intended to be pointed out in the claims, is not to be limited to or by details of construction of the particular embodiment thereof illustrated by the drawing or hereinbefore described.

I claim:

1. In a machine of the character described which comprises a pair of relatively movable members and a pair of elements mounted on said members respectively and adapted to engage dowel pins received between said elements for reducing the diameter thereof, one of said elements having a rotative movement; a way on one of said members in which the other member is slidable to adjust the distance between said elements, said way comprising an elongated bearing surface on one of said members and a pin extending through said member and an extension of the other member slidably bearing between said surface and said pin.

2. A machine of the character described which comprises: a pair of relatively movable members and a pair of elements mounted on said members respectively adapted to engage dowel pins received between said elements for reducing the diameter thereof, one of said elements having a rotative movement; a way on one of said members comprising a bearing surface upon which the companion member is longitudinally slidable toward the element carried by the other member said bearing being sufficiently wide that said companion member is laterally swingable thereon with respect to said other member; and adjustable means adapted to engage the member thus slidable and swingable on the way for holding the same at a desired angle to the axis of the rotative element carried by the other member for tapering said pins.

3. In a machine of the character described: a base member; a member longitudinally slidable thereon to adjust the distance between the hereinafter-mentioned elements and laterally swingable on the base member to adjust the relative inclination of said elements to desired angles; a pair of elements, one of them having a rotative movement, mounted on said members respectively and having mutually approaching surfaces adapted to engage dowel pins received between them for reducing the diameter thereof; threaded means for sliding the slidable member to adjust said distance; and threaded means, including the first-mentioned means, for holding said members in their slidably moved relative positions.

ANTHONY MARGELIS.